United States Patent [19]

Mouton

[11] Patent Number: 5,653,880
[45] Date of Patent: Aug. 5, 1997

[54] DEVICE FOR SEPARATING AND FILTERING PARTICLES IN A FLOW OF FLUID

[75] Inventor: Pierre Charles Mouton, Grigny, France

[73] Assignee: Societe Nationale d'Etude et de Construction de Moteurs d'Aviation "SNECMA", Paris, France

[21] Appl. No.: 757,952

[22] Filed: Nov. 22, 1996

Related U.S. Application Data

[63] Continuation of Ser. No. 552,849, Nov. 3, 1995, abandoned.

[30] Foreign Application Priority Data

Nov. 16, 1994 [FR] France .................... 94 13681

[51] Int. Cl.⁶ .................... B01D 21/26; B01D 29/00
[52] U.S. Cl. .................... 210/300; 210/512.1; 210/299; 55/459.1; 209/717; 209/718; 209/719
[58] Field of Search .................... 210/512.1, 788, 210/295, 299, 300; 55/459.1; 209/717, 718, 719

[56] References Cited

U.S. PATENT DOCUMENTS 3,872,012  3/1975  Endicott .
3,925,044  12/1975  Tu et al. .
4,162,906  7/1979  Sullivan et al. .................... 210/512.1
4,248,613  2/1981  Linhart .
5,478,484  12/1995  Michaluk .................... 210/512

FOREIGN PATENT DOCUMENTS 2 064 359  6/1981  United Kingdom .

Primary Examiner—David A. Reifsnyder
Attorney, Agent, or Firm—Oblon, Spivak, McClelland, Maier & Neustadt, P.C.

[57] ABSTRACT

A device for separating and filtering particles in a flow of contaminated fluid, the device including a casing having an inlet duct fitted with a cyclone separator designed to concentrate centrifugally particles in the inlet flow towards the periphery of the flow, a tubular element mounted in the casing with the upstream end of the element adjacent the inlet duct and having a diameter smaller than the inlet duct so that the substantially clean fluid from the cyclone separator flows into a central flow path within the tubular element and the contaminated fluid from the separator flows into a peripheral flow path between the tubular element and the casing, and a filter mounted in the casing adjacent an outlet duct so that the clean fluid in the central flow path passes through a central passage of the filter to the outlet duct and the contaminated fluid in the peripheral flow path is filtered by the filter to form a filtered flow which mixes with the clean fluid in the central passage whereby the fluid flow rate in the outlet duct is the same as in the inlet duct.

3 Claims, 1 Drawing Sheet

5,653,880

1

DEVICE FOR SEPARATING AND FILTERING PARTICLES IN A FLOW OF FLUID

This application is a Continuation of application Ser. No. 08/552,849, filed on Nov. 3, 1995, now abandoned.

BACKGROUND OF THE INVENTION

1. Field of the invention

The invention relates to a device for separating and filtering particles in a flow of fluid, and is particularly applicable to the separation and filtration of solid particles in a metered fuel supply to a turbomachine.

2. Summary of the prior art

In numerous devices which operate with highly pressurized liquids, it is necessary that the liquid should be perfectly filtered in order to avoid wear caused by contaminants in the liquid. It is current practice to comply with this requirement by using a filter cartridge which can be replaced when clogged. It is also current practice to fit a bypass valve which enables the liquid to keep flowing by avoiding a clogged cartridge. The condition of the filter must therefore be regularly checked in order to avoid rapid deterioration of the expensive equipment which the filter is intended to protect.

In the particular case of a turbomachine fuel supply and metering system generally comprising a gear pump, for example of the proportioning type, a flow metering device and fuel injectors, it is necessary to protect the system from external contamination originating from the fuel tanks, and to protect the metering device and the fuel injectors from contamination due to particles produced by wear or deterioration of the pump. However, it is not possible to achieve this double protection by using only one filter. Moreover, using two filters sited one upstream and one downstream of the pump leads to installation difficulties, an increase of the mass of the engine, additional maintenance operations, and operational difficulties due to the considerable pressures downstream of the pump. Furthermore, these systems introduce noticeable pressure drops which increase according to the degree of clogging of the filter.

SUMMARY OF THE INVENTION

It is therefore one object of the invention to provide a device for the separation and filtering of heavy solid particles in a fluid flow which is effective, insensitive to clogging, and introduces only small pressure drops.

Another object of the invention is to provide a separation and filtering device which may be used without problems downstream of a mechanical filter in those cases when double protection is required, such as in the case of a fuel supply circuit including a gear pump and particles originating from wear or deterioration of the pump need to be filtered from the fuel.

A further object of the invention, in the particular case of a fuel supply system, is to provide a separation and filtering device requiring no particular monitoring other than maintenance operations on breakdown of the fuel pump, and which involves no danger of causing a malfunction of the fuel dispensing system.

According to the invention, these and other objects are satisfied by providing a device for separating and filtering particles in a contaminated fluid flow, comprising:

a casing;

an inlet duct for the flow of contaminated fluid into said casing;

2 an outlet duct for the flow of clean fluid out of said casing;

a cyclone separator mounted in said inlet duct and operative on said contaminated fluid flowing through said inlet duct to concentrate particles in said contaminated fluid flow towards the periphery of the flow;

a tubular element mounted in said casing so as to define two coaxial fluid flow paths consisting of a central flow path within said tubular element and a peripheral flow path between said tubular element and said casing, said tubular element having an upstream end adjacent the downstream end of said cyclone separator and said upstream end having a diameter which is less than the diameter of said inlet duct whereby contaminated fluid flows from said cyclone separator into said peripheral flow path and substantially clean fluid flows into said central flow path; and, a mechanical filter element mounted in said casing adjacent said outlet duct for filtering the contaminated fluid flow which passes through said peripheral flow path;

said mechanical filter element having a central passage which communicates with both said central flow path and said outlet duct, and into which central passage the filtered flow of fluid from said peripheral flow path passes to mix with the clean fluid flow from said central flow path whereby the fluid flow rate in said outlet duct is the same as the fluid flow rate in said inlet duct.

If necessary, the device may further comprise an inertial separator disposed in said central flow path coaxially with said tubular element, said inertial separator having an upstream tubular part which is closed at its upstream end and a downstream tubular part which extends said inertial separator beyond said tubular element and which, with said upstream tubular part, defines a central passage and, with said tubular element, defines a bypass passage leading into said peripheral flow path, the upstream end of said downstream tubular part having a diameter which is less than the diameter of the downstream end of said upstream tubular part and defining therewith an annular passage for conducting clean fluid into said central passage of said inertial separator from the substantially clean fluid flow which enters said central flow path while the remainder of said substantially clean fluid flow carrying any residual particles is conducted by said bypass passage to join said contaminated fluid flow in said peripheral flow path.

Thus, the invention is based on dividing the contaminated fluid to be treated into two fluid flow paths by utilizing the force of inertia or centrifugal force on the particles in the fluid, the density of the particles being high relative to the density of the fluid.

In the preferred embodiments, division of the flow to be treated is carried out by imparting a helical movement to the axial fluid flow, so that the centrifugal effect concentrates the heavy particles at the periphery of the fluid flow. The central portion of the flow, cleared of the heaviest particles, is then passed through an inertial separator which completes the separation of the remaining particles. The contaminated peripheral fluid flow passes through a mechanical filter arrangement which holds back the particles while allowing the purified fluid to pass and rejoin with the central clean flow. The whole of the fluid flow entering the device thus appears at the outlet thereof, but without the contaminant particles.

Other preferred features and advantages of the invention will become apparent from the following description of a preferred embodiment, given by way of example, with reference to the attached drawings.

DESCRIPTION OF THE PREFERRED EMBODIMENT

The particles resulting from wear and deterioration of a gear pump in a fuel supply system are composed, in the main, of bronze dust originating from the bearings of the pump, and flakes originating from the gears. The density of these particles is 7 to 10 times greater than that of the fuel.

Figure 1:
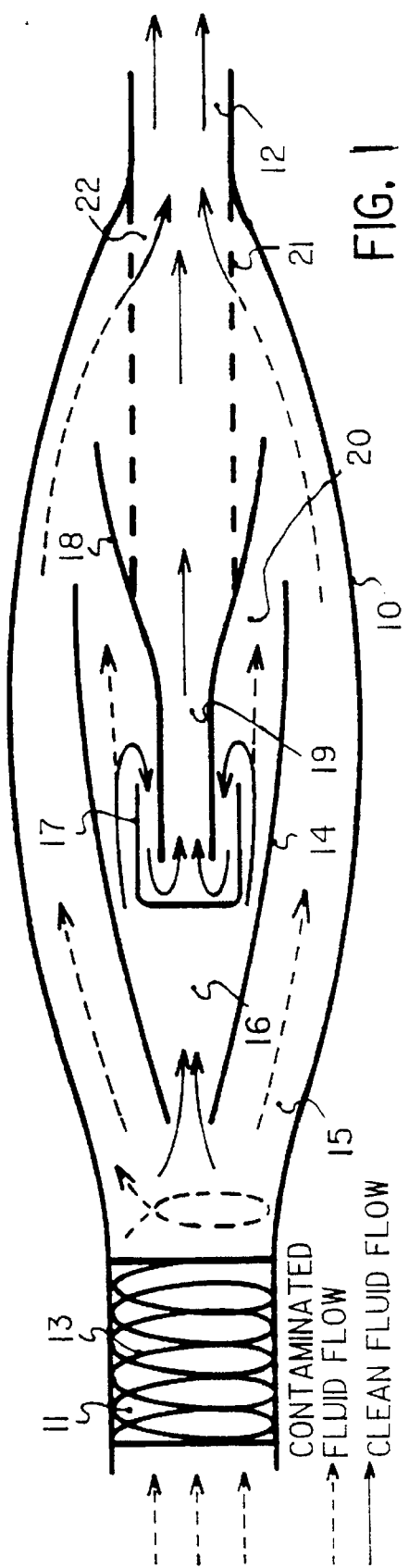
FIG. 1 is a sketch diagram showing the principles of one embodiment of a device in accordance with the invention, indicating the flows of clean fluid and fluid contaminated by heavy particles; and, FIG. 2 is an axial sectional view of an actual example of the embodiment depicted in FIG. 1.
Figure 2:
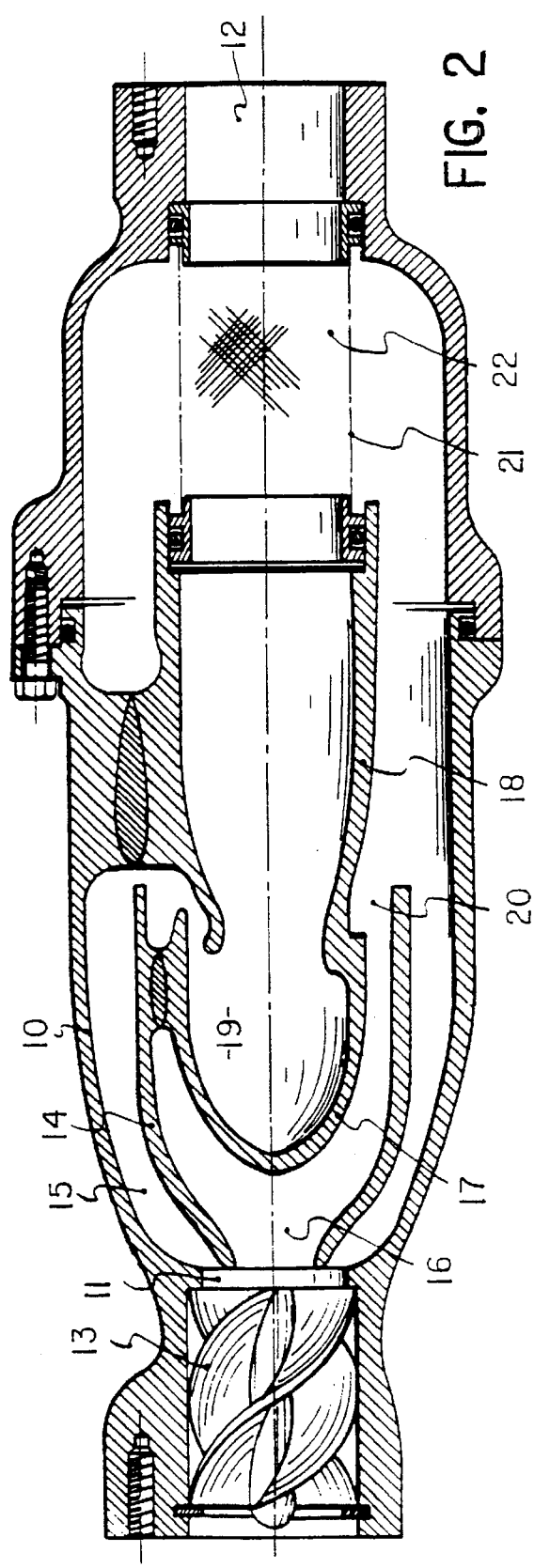

To separate and filter out these particles, a device in accordance with the invention as shown in FIGS. 1 and 2 may be used. This device includes a casing 10 provided with an inlet duct 11 and an outlet duct 12. Inside the casing there is a first separation device consisting of a cyclone type separator 13 associated with a tubular element 14.

The cyclone separator 13 is located in the inlet duct 11 and comprises a helical bushing intended to impart to the contaminated fluid entering the duct 11 a swirling movement around the longitudinal axis of the duct. As a result of centrifugal action, the swirling movement forces the heavy particles in the fluid to move towards the peripheral zone of the inlet flow, while the lightest particles remain nearer the central part of the flow.

The tubular element 14 is located at the downstream end of the cyclone separator 13, and has a diameter at its upstream end which is smaller than that of the inlet duct 11. The tubular element 14 preferably diverges from its upstream end and defines an annular passage 15 between it and the wall of the casing 10 intended to receive the outer portion of the fluid flow from the separator 13 which is considerably charged with heavy particles, and a central passage 16 intended to receive the central portion of the fluid flow which is relatively clear of particles. The tubular element 14 thus defines two coaxial flow paths for the fluid, consisting of a central flow path 16 for the relatively clean portion of the fluid, and a peripheral flow path 15 for the heavily contaminated portion of the fluid.

To complete the separation of the particles from the fluid, a second separation arrangement is located in the central flow path 16 coaxially with the tubular element 14. This second separation arrangement is of the inertial separator type and has an upstream part 17 which is housed within the tubular element 14 and is of a substantially cylindrical shape with a diameter smaller than the tubular element 14 to allow fluid to flow between them, the upstream part 17 being closed at its upstream end. The inertial separator also has a downstream part which forms a deflector element 18 of a flared shape and which has its upstream end located within the downstream end of the cylindrical upstream part 17 and of a smaller diameter so as to define an annular passage between the deflector element 18 and the wall of the cylindrical part 17. The deflector element 18 extends axially beyond the tubular element 14, and defines with the upstream part 17 a central cylindrical passage 19 forming part of the central flow path for the clean fluid.

The presence of the separator in the central flow path 16 initially acts to cause the central flow from the cyclone separator 13 to flow between the cylindrical upstream part 17 and the tubular element 14, and then, at the downstream end of the cylindrical part 17, to cause a portion of this central flow to change direction suddenly so that it proceeds, via the annular passage between the upstream and downstream parts 17 and 18 into the cylindrical central passage 19. As the change of direction takes place with a very small radius of curvature, the particles not separated by the cyclone separator and remaining in the central flow cannot perform the change of direction and hence continue with the rest of the flow along a bypass passage 20 between the deflector 18 and the tubular element, the passage 20 leading into the peripheral duct 15 where the contaminated fluid flows. Only the flow of clean fluid cleared of the particles thus flows along the central cylindrical passage 19.

At the downstream end of the deflector 18, a cylindrical mechanical filter element 21, designed to hold back the heavy particles in the peripheral flow path, is mounted between the deflector 18 and the outlet duct 12 with a cylindrical central through passage 22 of the filter element 21 communicating coaxially with the central passage 19 of the inertial separator 17, 18 and with the outlet duct 12. The central passage 22 thus enables the clean fluid flowing through the central flow path of the separation device to flow directly into the outlet duct 12. In practice, the device will preferably be operated vertically with the flow in a downward direction, since this will ensure that the particles held back by the filter 21 will be retained in the best manner.

The flow of contaminated fluid from the peripheral duct 15 and the bypass passage 20 is intercepted by the filter device 21, which retains the particles and permits the purified fluid to pass through the filter into its central passage 22 to join the clean flow.

The whole of the separated and filtered fluid then flows into the outlet duct of the device. As all the fluid entering the separation and filtration device exits at the outlet of the device, it is thus possible to install the device in a system in which the flow of fluid has been previously metered.

The separation and filtering device as described above has a number of advantages. Firstly the device is not seriously affected by clogging. If the filter 21 becomes clogged, the fluid flow continues to pass along the central flow path without using the bypass passage, and thus without any danger of releasing the impurities contained in the filter 21. There occurs only a deterioration of the separation power, as the whole of the fluid flow passes through the central path 16. However, the separation and filtration device will continue to act as a particle trap. Secondly, the separation and filtration device is unaffected by icing, even if the temperature is below 0° Celsius, as the central flow path is very permeable and cannot be clogged with ice particles. Only the heavy particles are separated and filtered, while light or very fine particles remain in the central flow. There is therefore no risk that these will contaminate the filter 21, which may therefore be very fine.

The invention is of course not restricted to the embodiment as just described. For example, there need not necessarily be two particle separators. In particular, it is not essential to instal an inertial separator in the central fluid flow path downstream of the cyclone separator. Indeed, the device need only have a cyclone separator 13 associated with a tubular element 14, and a mechanical filter element 21 mounted between the tubular element 14 and the outlet duct for filtering the flow of contaminated fluid in the peripheral flow path and allowing free passage of the flow of clean fluid in the central flow path. It is also possible to arrange several inertial separators in series, with the filter element 21 being placed between the deflector of the final separator and the outlet duct. In all embodiments, the pressure drop across the device is very small, and the rate of flow of fluid issuing from the device is the same as the rate of flow of fluid entering it.

Furthermore, when using the separation and filtration device in a fuel supply circuit including a filter arranged upstream of a pump, the centrifugal separator is effective even if the upstream filter becomes clogged. In this case, it is possible to ensure that the fluid delivered is of suitable purity. Should both the upstream filter and the filter 21 become clogged, the flow of relatively clean fluid is still maintained.

What is claimed is:

1. A device for separating and filtering particles in a contaminated fluid flow, which comprises:

a casing, said casing including an inlet duct for the flow of contaminated fluid into said casing and an outlet duct fort he flow of clean fluid out of said casing;

a cyclone separator mounted in said inlet duct and operative on said contaminated fluid flowing through said inlet duct to concentrate particles in said contaminated fluid flow towards a periphery of the flow;

a tubular element mounted in said casing so as to define two coaxial fluid flow paths downstream of said cyclone separator, said paths including a central flow path within said tubular element and a peripheral flow path between said tubular element and said casing, said tubular element having an upstream end adjacent the downstream end of said cyclone separator and said upstream end having a diameter which is less than the diameter of said inlet duct such that contaminated fluid flows from said cyclone separator into said peripheral flow path and substantially clean fluid flows into said central flow path;

a filter element mounted in said casing adjacent said outlet duct;

said central flow path directly communicating with said outlet duct without passing through said filter element such that fluid flow which passes from said central flow passes to said outlet duct and is not filtered by said filter element; and said peripheral flow path communicating with said outlet duct via said filter element such that the fluid flow rate in said outlet duct is the same as the fluid flow rate in said inlet duct, said filter element filtering the contaminated fluid flow which passes through said peripheral flow path.

2. A device for separating and filtering particles in a contaminated fluid flow, which comprises:

a casing, said casing including an inlet duct for the flow of contaminated fluid into said casing and an outlet duct for the flow of clean fluid out of said casing;

a cyclone separator mounted in said inlet duct and operative on said contaminated fluid flowing through said inlet duct to concentrate particles in said contaminated fluid flow towards a periphery of the flow;

a tubular element mounted in said casing so as to define two coaxial fluid flow paths, the paths including a central flow path within said tubular element and a peripheral flow path between said tubular element and said casing, said tubular element having an upstream end adjacent the downstream end of said cyclone separator and said upstream end having a diameter which is less than the diameter of said inlet duct such that contaminated fluid flows from said cyclone separator into said peripheral flow path and substantially clean fluid flows into said central flow path;

a filter element mounted in said casing adjacent said outlet duct, said filter element filtering the contaminated fluid flow which passes through said peripheral flow path;

said filter element having a central passage in fluid communication with both said central flow path and said outlet duct, and into which central passage a filter flow of fluid from said peripheral flow path passes to mix with the clean fluid flow from said central flow path such that the fluid flow rate in said outlet duct is the same as the fluid flow rate in said inlet duct; and an inertial separator disposed in said central flow path coaxially with said tubular element, said inertial separator having an upstream tubular part which is closed at its upstream end and a downstream tubular part which extends said inertial separator beyond said tubular element and which, with said upstream tubular part, defines a central passage and, with said tubular element, defines a bypass passage leading into said peripheral flow path, the upstream end of said downstream tubular part having a diameter which is less than the diameter of the downstream end of said upstream tubular part and defining therewith an annular passage conducting clean fluid into said central passage of said inertial separator from the substantially clean fluid flow which enters said central flow path while the remainder of said substantially clean fluid flow carrying and residual particles is conducted by said bypass passage to join said contaminated fluid flow in said peripheral flow path.

3. A separation and filtration device according to claim 2, wherein said downstream tubular part of said inertial operator is located upstream of said filter element, and said inertial separator is in fluid communication with said central passage of said filter element.

* * * * *

UNITED STATES PATENT AND TRADEMARK OFFICE
CERTIFICATE OF CORRECTION

PATENT NO. : 5,653,880
DATED : AUGUST 5, 1997
INVENTOR(S) : PIERRE C. MOUTON

It is certified that error appears in the above-identified patent and that said Letters Patent is hereby corrected as shown below:

Column 5, line 14, change "fort he" to --for the--.

Signed and Sealed this

Sixth Day of January, 1998

Attest:

Attesting Officer

BRUCE LEHMAN

Commissioner of Patents and Trademarks